United States Patent [19]

Dumstorff et al.

[11] 3,789,367

[45] Jan. 29, 1974

[54] MEMORY ACCESS DEVICE

[75] Inventors: Eugene Francis Dumstorff; John Howard Iverson; Phillip Christian Schloss; Philip Chuck-Yueh Wong, all of Rochester, Minn.

[73] Assignee: International Business Machines Corporation, Armonk, N.Y.

[22] Filed: June 29, 1972

[21] Appl. No.: 267,264

[52] U.S. Cl. .............................................. 340/172.5
[51] Int. Cl. .......................... G06f 3/00, G06f 13/00
[58] Field of Search .................... 340/172.5, 324 AD

[56] References Cited

UNITED STATES PATENTS

| | | | |
|---|---|---|---|
| 3,406,387 | 10/1968 | Werme | 340/324 |
| 3,449,620 | 6/1969 | Caron et al. | 315/22 |
| 3,497,613 | 2/1970 | Botjer et al. | 178/6.8 |
| 3,534,338 | 10/1970 | Christensen et al. | 340/172.5 |
| 3,573,787 | 4/1971 | Sandgren et al. | 340/324 |
| 3,581,290 | 5/1971 | Sugarman | 340/172.5 |
| 3,648,250 | 3/1972 | Low et al. | 340/172.5 |
| 3,671,957 | 6/1972 | Kegelman et al. | 340/324 A |

*Primary Examiner*—Paul J. Henon
*Assistant Examiner*—James D. Thomas
*Attorney, Agent, or Firm*—Robert W. Lahtinen

[57] ABSTRACT

The specification describes a memory access technique wherein a display or other controlled device accesses sequential locations in memory without control unit intervention following an initial address and a selection of operating mode. An interfaced display continously displays data, status, prompting and/or operator guidance information from selected memory locations independent of the system control unit following mode select and an initial address. The display as shown includes a wiggle sweep cathode ray tube display controlled by a series of counters.

9 Claims, 5 Drawing Figures

MEMORY ACCESS DEVICE

BACKGROUND OF THE INVENTION

There are extensive applications for control units that permit devices to be independent of the resources of the system to which the device is attached. To broaden the feasibility of such use, however, it is necessary that it be possible to utilize low cost, low performance control units to perform such functions. This can be accomplished only if ways can be found to avoid such demands on control unit time as the necessity to formulate and present each address to memory.

The device of the present invention is designed to optimize addressing the memory when the control unit is addressing sequential locations in memory. An example of this type of operation is when data is being transferred to or from the buffer on a record basis. The technique is also designed so that an external device can access memory independent of the control unit which functions only to set up the initial address. The illustrated embodiment shows a cathode ray tube (CRT) display connected to a memory to address sequential memory locations on a recurring basis without control unit intervention. The technique is applicable with any random access memory.

The CRT attachment of the disclosed embodiment displays six lines of data, each 40 characters long. The video output provides for a 7 × 9 dot matrix, the wiggle control for sweeping out the character, the line control code for determining the vertical position of the line, and the horizontal sweep control. The 7 × 9 character matrix resides within a 10 × 11 matrix allowed for each character which is necessary to display a cursor and space the characters. In addition to the above function, the CRT attachment has a tandem mode of operation which permits data displayed on the CRT to be presented in such a manner as to be used to display data for two operators.

The display is generated using a series of four counters. The first counter creates the dot times for the wiggle sweep. The second counter counts the sweeps, addresses the character generator after each sweep; calls for a new character after the seventh sweep (when the character is completed) and increments the character counter following the tenth sweep. The character counter indexes the line counter at the completion of each line of 40 characters and generates the horizontal return line which controls the horizontal sweep. Various modes of data arrangement may be selected for presenting the lines of characters on the CRT.

The control unit merely sets the mode select (which selects the arrangement of data on the CRT); sets the display mode for invalid character, which may take such forms as all dots on or all dots off, and initializes the buffer address to the starting address. The attachment accesses the buffer for data as needed on a time slice basis without interrupting the control unit or any other input/output operation. The display runs independent of the control unit from this point on, until the operator changes from one operating mode to another. This structure allows the control unit more time to increase the overall flexibility of the machine and is particularly adapted to small, low performance systems where it is desired to minimize control unit interference from input/output devices.

It is an object of the present invention to provide a controlled device interface that functions to address sequential locations in memory substantially independent of the associated control unit. It is a further object of the invention to provide a display that functions in multiple modes and may display information from selected memory locations without recurring intervention by the device control unit. The foregoing and other objects, features and advantages of the invention will be apparent from the following more particular description of a preferred embodiment of the invention, as illustrated in the accompanying drawings.

DETAILED DESCRIPTION

Figure 1:
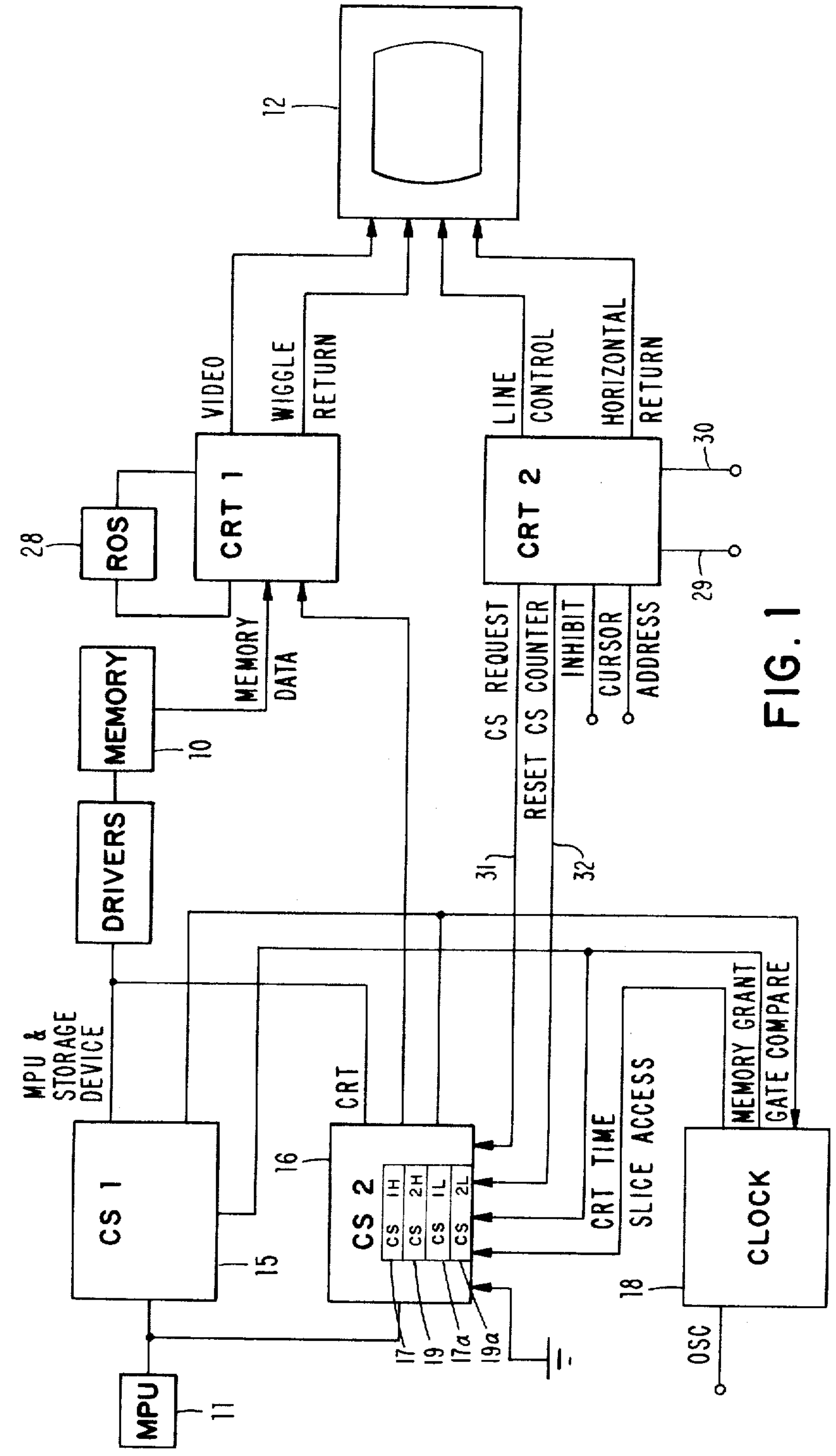
FIG. 1 is a schematic diagram showing the controlled device interface including the buffer memory, display control and control unit interconnections.

Referring to FIG. 1 portions of a device are shown which include a memory 10 which is addressed by a micro programmed control unit (MPU) 11; a data storage device (not shown), such as a tape or disk drive and a display 12. Details of a cathode ray tube (CRT) display are shown connected to memory 10 and cycle steal module 16 as an example of an external device.

Each of cycle steal (CS) modules 15 and 16 contain four registers (two of which are self incrementing or decrementing), logic for latching up requests to memory 10 from I/O devices, and logic to gate the granting of the requests which can be time sliced.

Instead of the more frequently used time slicing technique wherein instructions or blocks of consecutive instructions are allocated to various devices or functions being serviced by a processor, time slicing in the present environment allocates portions of each instruction. The tine slices utilized therein are consecutive, mutually exclusive portions of each instruction which permit multiple devices to access the same memory subdivision during any instruction cycle. In the system shown, there are three time slices: a first partition of the instruction is assigned to the CRT display; a second to the control unit; and a third is assigned to an associated storage device (not shown). Accordingly, during any instruction cycle, the memory subdivision may be accessed by the CRT display to obtain a character to be displayed, by the control unit to enter or withdraw data and by a storage device to withdraw data for storage in such storage device - each access occurring during a partition or time slice exclusive of the other two.

Modules 15 and 16 are designed to interface with control unit 11 as a register module. Thus, control unit 11 can directly manipulate the registers within modules 15 and 16. The registers 17, 17*a*, 19 and 19*a* of cycle steal module 16 are initially loaded by MPU 11 during the power up sequence wherein various portions of the system are initialized. This technique of loading registers from a processor is shown in such prior art patents as U. S. Pat. No. 3,432,813, wherein a data register 122, shown in the instruction and data flow diagram of FIG. 7, is loaded by the associated control unit and accordingly the technique will not be described further herein. The content of each register pair such as register 17 and 17*a* includes an address portion which identifies the 128 byte portion of memory 10, of which 120 bytes will be displayed and an additional address portion that identifies the current character within the 128 byte portion. Similarly, the content of registers 19 and 19*a* identify the 128 byte portion of memory 10 and the current character therein which is to be displayed. The registers are used to hold the addresses to be supplied to memory when access is granted. As shown in FIG. 1, to grant a memory cycle the first event is a cycle request from the I/O device to the associated cycle steal module 15 or 16. After the request is generated, a "Gate Compare" signal is sent from the CS module to clock 18 upon the occurrence of the next time slice associated with that I/O device. Internal to the CS module, this signal also gates to memory 10 the address held on the CS module associated with the I/O device requesting the cycle. Upon completion of the above events, the cycle steal will be granted during that time slice. The next event in granting the cycle is the generation of a "Buffer Grant" signal from clock 18 during the final quarter of the time slice. The "Buffer Grant" signal is transmitted to CS modules 15 and 16 which determines the CS module in use based on the current time slice signal on the module. A second buffer grant signal is then generated on the CS module whose time slice is present and sent to the I/O device being granted the cycle. This latter buffer grant signal gates the data transfer, resets the condition causing the request and increments the low order register 17*a* or 19*a* currently in use to implement the self incrementing capability.

Two CS modules are used to handle all memory input and output. Each of modules 15 and 16 is capable of handling two external devices. Module 15 serves the control unit and a storage device while module 16 serves the CRT display 12. The memory accesses are granted to the I/O devices during the first occurrence of the time slice assigned to the device after the request has been generated.

Each external device has two dedicated registers on the CS module to which it attaches for holding the address for accessing memory 10. The dedicated register pairs 17, 17*a* and 19, 19*a* are denominated high and low registers of which the low registers 17a and 19*a* are self incrementing (self decrementing in certain operating modes). These self incrementing registers are divide-by-N counters as shown in "Designing With TTL Integrated Circuits" by Morris and Miller, published by McGraw-Hill (1971) beginning at page 271. This incrementing ability eliminates the need for the program to increment the address between control unit memory accesses when transferring data to, from or within interface memory 10 on a record basis. Each instruction cycle is time sliced into discrete consecutive portions. During a first period the memory 10 may be accessed by the display and during a second period the memory 10 may be accessed by the control unit 11. Whenever there is a call for service by the display present when the first period of a cycle commences, the request will be serviced during that first period or display unit time slice. If the service request occurs after the initiation of the time slice, such request will not be serviced until the occurrence of the time slice in the next succeeding cycle. Since accesses to memory 10 are time sliced, no two I/O devices are accessing the memory at the same time and thus the access lines from CS modules 15 and 16 are dotted together.

Although each of the CS modules nominally serves to interface two controlled devices with the memory 10, module 16 functions to interface solely between the CRT display and memory. The CRT display appears to the module 16 as two external devices. The display presents six lines of forty characters each and is partitioned into two units of three lines. This permits greater flexibility as half the display may address one area of memory 10 and the other half may address another area. The data entry provided through the control unit 11 requires a full image buffer or a dedicated buffer for storing the complete data record. Since the subdivision of memory 10 selected contains the same data using the same format required for both data entry and display, the time sliced instruction cycles enable dual usage of the stored data. The result is to permit the structure to function as a full image buffer with respect to servicing the display device without specifically providing such a buffer. The display portions may be selectively used to exhibit two different three line data records or a single record and status, prompting or operator guidance information variously interleaved with the data in the six lines of display.

The CRT display attachment of the disclosed embodiment display six lines of data, each 40 characters long. The video output provides for a 7 × 9 dot matrix, the wiggle control for sweeping out the character, the line control code for determining the vertical position of the line and the horizontal sweep control. The 7 × 9 character matrix is contained within the 10 × 11 matrix allowed for each character position. The 10 × 11 matrix is used to provide the necessary spacing between adjacent characters and successive lines. In addition to the above function, the CRT display attachment has multiple modes of operation. In one mode of operation, the available six line display may be allocated to provide a three line display for each of two operators having access to a common display. In other operating modes, the six lines may be displayed in varying sequences to permit data to be displayed on successive lines or permit lines of data to be interleaved with prompting or status information.

Figure 3:
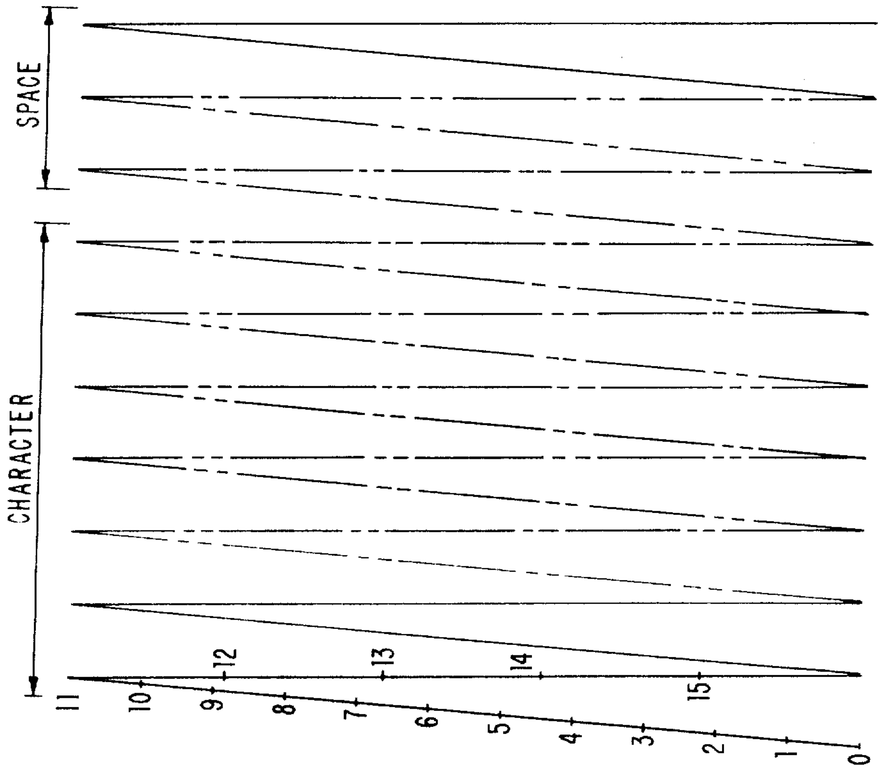
FIG. 3 is a chart showing the wiggle sweep dot sequence that is used to create the dot matrix.
Figure 2:
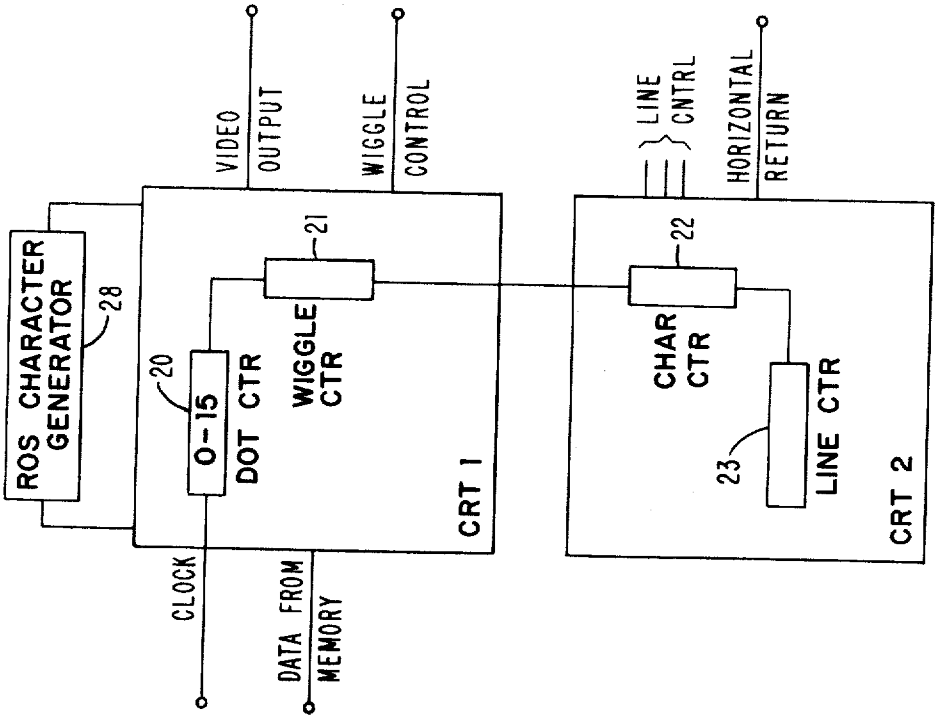
FIG. 2 is a showing of the sequential counter system used to control the wiggle sweep of a CRT display.

The display function is accomplished through a series of counters interconnected as shown in FIG. 2 and driven by a 2.25 megacycle clock. The counters 20, 21 and 23 are ring counters and counter 22 is a ripple counter. Ring counters and ripple counters suitable for this application appear in "Designing with TTL Integrated Circuits" supra, wherein ring counters are shown beginning at page 292 (see FIG. 11.10) and ripple counters are described beginning at page 243. The first counter 20 is a 16 position shift counter which functions to gate the dots on the dot matrix to form the character. The 2.25 megacycle clock results in a 444 nanosecond dot period with 16 dot times forming one wiggle time as shown in FIG. 3. The 16 dot times per wiggle results in a 7.1 micro second wiggle cycle or a 71 micro second per character cycle since 10 wiggles form one character. As seen in FIG. 3, the 16 position counter is used to generate the wiggle control to the CRT display which causes the beam to rise and fall to generate the wiggle sweep and also increments the wiggle counter 21 which is used to keep track of the number of wiggle sweeps completed for a character. As shown, the 11 dot matrix is formed by using the first 11 counts of the 16 count wiggle sweep (counts 0 through 10) and effecting a return during the remaining five counts 11 through 15. The output of counter 20 increments counter 21 which keeps track of the number of wiggle sweeps completed for a character. The wiggle counter 21 also functions to request a new character after sweep 7 of a character is displayed. The wiggle counter 21 following the 10th sweep increments the character counter 22 which keeps track of the number of characters displayed on a line as it is being refreshed. The character counter 22 generates the horizontal return line which controls the horizontal sweep. The horizontal sweep is designed to pass two character times at the beginning of a line without displaying any characters which allows the sweep to linearize and further allows 12 character times for the beam to retrace. This results in 54 character times to service one line or with a 71 micro second character time causes the entire display to be refreshed in a period of 23.004 milliseconds. This results in 42 refreshes per second. The amount of time spent in retracing can be changed to accommodate the particular CRT design which may require a different duty cycle for horizontal sweep. The character counter 22 increments the line counter 23 which keeps track of the line which is being refreshed. The output of counter 23 is gated on to cycle steal request lines 31 to cycle steal module 16 to switch address control to memory 10 at the end of the third line from register 17 and 17*a* to registers 19 and 19*a*. At the end of the sixth line, address control is switched back to registers 17 and 17a and both the additional address portions that identify the current character are reset to zero by a signal on line 32.

Figure 4:
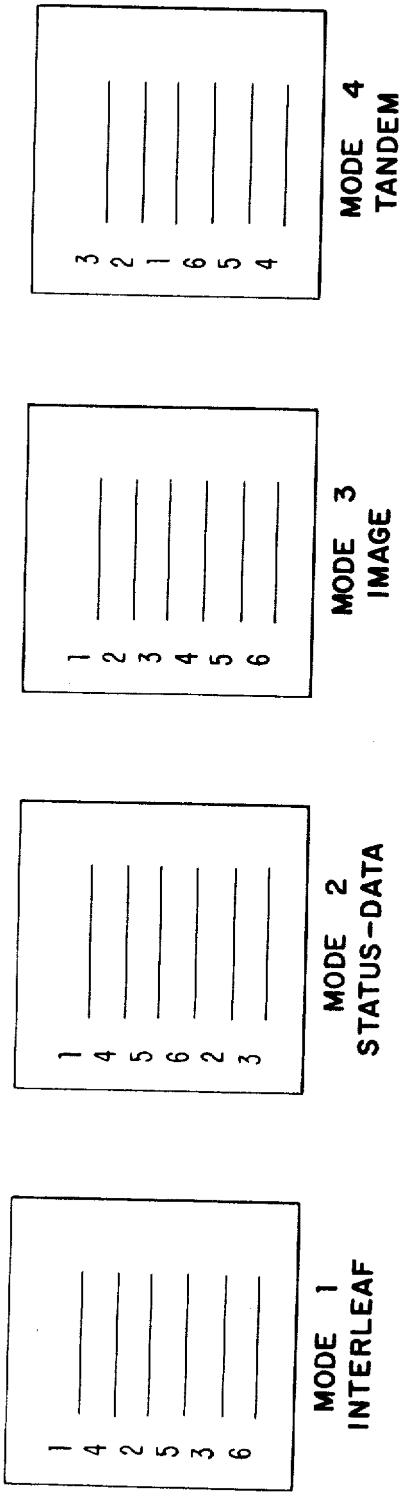
FIG. 4 illustrates various line sequencing arrangements to implement different modes of display.

The line control is manipulated by two mode select lines 29 and 30 which are encoded to select one of four different arrangements or modes of displaying the data on the CRT. This is accomplished by a standard two-bit decode to establish four discrete states each respectively associated with one of the four modes shown in FIG. 4. FIG. 4 is exemplary of four different modes of display which are made available for different applications to rearrange the data displayed on the CRT without rearranging the data in the source, such as memory 10. This makes the attachment more flexible without significantly increasing the problem of control. The control unit simply sets the mode selection to the desired operating mode.

Figure 5:
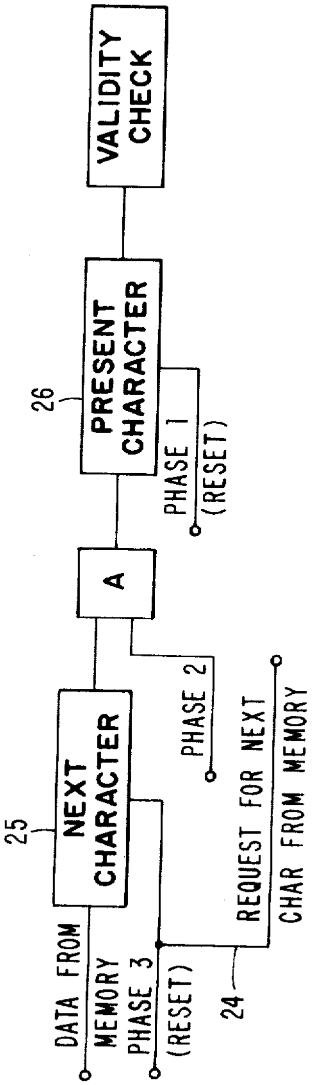
FIG. 5 shows the hardware for buffering the present and next characters from memory prior to display.

The display attachment as shown in FIG. 5 transmits a request for a new character on line 24. The next character is received from memory 10 and held in buffer 25. When sweep 7 of the character is completed, the wiggle counter is used to generate three phases in sequence which gate the next character (held in buffer 25) into the present character register 26 to be displayed. Phase one resets the present character register, phase two gates the next character into present character register 26, and phase three resets next character register 25 and requests another character from memory 10. Accessing the buffer for the next character is thereby overlapped with the display of the character just gated into the present character register 26. The interface between the control unit 11 accesses memory 10 through cycle steal module 15; the CRT display attachment and memory 10 are designed so that the CRT display can access data from the memory 10 when required without requiring service from the control unit 11 or interferring with the control unit or storage device which also access the memory.

After a character is gated to the present character register 26, it is format checked by the attachment for validity. If the character in present character register 26 is invalid, the display will indicate such invalid character as for example by either turning off all dots in the bit pattern or turning on all dots in the bit pattern to indicate such invalidity in accordance with the mode of display selected by the control unit. If the character is valid, it is displayed.

The actual dot patterns for displaying a valid character are obtained from a character generator 28. Character generator 28 is a read only storage element which upon receiving an address responds with a bit pattern as indicated by the addressed memory location. A similar structure to provide this function is shown in U. S. Pat. No. 3,540,031. Once a character is gated into the present character register and found to be valid, the low order six bits are gated to the character generator 28, which is a read only store memory device, as an address to the portion of such memory holding the dot patterns for that particular character. Using a 7 × 9 character matrix there is a series of 7 wiggle sweeps with different dot outputs requiring that the character generator be addressed 7 times per character. This is accomplished by including three bits of the wiggle counter output as part of the character generator address resulting in a 9 bit address to the character generator for getting the dot patterns out. Since the dot matrix is 9 high, there are 9 outputs from character generator 28 each time it is addressed for the dot pattern of a sweep. These outputs are brought back to the attachment to be clocked out by the 16 position shift counter 20.

While the invention has been shown and described with reference to a preferred embodiment thereof, it will be understood by those skilled in the art that various changes in form and details may be made therein without departing from the spirit and scope of the invention.

What is claimed is:

1. A data handling system comprising
a control unit,
memory means operatively connected to said control unit,
a controlled device,
adapter means interconnecting said controlled device with said memory means and said control unit,
said control unit providing an initial address which identifies a subdivision of said memory, and
said adapter means providing sequential addresses to said memory subdivision independent of said control unit subsequent to said initial address.

2. The data handling system of claim 1 wherein said adapter means includes a self incrementing register for identifying a recurring sequence of address locations within said memory subdivision following said initial address.

3. The data handling system of claim 1 wherein said controlled device is a CRT display comprising
a wiggle sweep deflection circuit including,
a first counter which gates dots within a sweep;
a second counter, indexed by said first counter, which counts the sweeps within a character;

a third counter, indexed by said second counter, which counts characters in a line;

a fourth counter, indexed by said third counter, which counts the lines of the display.

4. The data handling system of claim 3 wherein said second counter accesses said memory means for the character resident at the next subsequent address position following the sweep which completes the character presently being displayed.

5. The data handling system of claim 4 further comprising a character generator and wherein said CRT display accesses said character generator when said first counter completes a sweep to determine the dot pattern of the next sweep.

6. A data handling system comprising a micro programmed control unit;

memory means operatively connected to said control unit to receive data therefrom;

a controlled device;

adapter means interconnecting said controlled device with said memory means and said control unit;

means for providing an initial address from said control unit to said memory whereby an operating mode is established for said controlled device, and address sequencing means for providing said controlled device a recurring sequence of addresses to said memory independent of said control unit subsequent to said initial address, with said sequence of addresses continuing until a new initial address is provided by said control unit.

7. The data handling system of claim 6, wherein said controlled device is a display and said initial address identifies a discrete block of data character positions in said memory means which are to be presented on said display.

8. The data handling system of claim 7 wherein said control unit and said display access said memory during mutually independent time slices on a common data path.

9. The data handling system of claim 8, wherein said display is partitioned into two portions and said adapter means functions on command of said control unit to provide an initial address for each portion and a recurring sequence of addresses for each such portion to display data from two discrete areas in said memory.

* * * * *